United States Patent
Patz et al.

(10) Patent No.: US 7,942,059 B2
(45) Date of Patent: May 17, 2011

(54) SENSOR ARRANGEMENT

(75) Inventors: Juergen Patz, Beuren (DE); Thomas Merk, Wendlingen (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 355 days.

(21) Appl. No.: 12/240,107

(22) Filed: Sep. 29, 2008

(65) Prior Publication Data

US 2009/0084186 A1  Apr. 2, 2009

(30) Foreign Application Priority Data

Sep. 29, 2007  (DE) .......................... 10 2007 046 769

(51) Int. Cl.
*G01H 9/00* (2006.01)

(52) U.S. Cl. ............................................ 73/655; 73/656

(58) Field of Classification Search .................... 73/655, 73/656, 649, 865.8, 866; 356/28; 250/214 R
See application file for complete search history.

(56) References Cited

U.S. PATENT DOCUMENTS

| 5,486,063 | A | 1/1996 | Fox et al. | |
| 5,796,091 | A | 8/1998 | Schmidt et al. | |
| 6,314,054 | B1 | 11/2001 | Priebsch | |
| 6,316,762 | B1 * | 11/2001 | Argast et al. | 250/214 R |
| 6,709,393 | B2 | 3/2004 | Ogawa | |
| 6,922,248 | B2 * | 7/2005 | Steegmuller | 356/496 |
| 7,172,195 | B2 | 2/2007 | Sano et al. | |
| 7,283,892 | B1 * | 10/2007 | Boillot et al. | 700/245 |
| 7,437,960 | B2 * | 10/2008 | Priebsch | 73/865.8 |
| 7,518,737 | B2 * | 4/2009 | Hall et al. | 356/521 |
| 7,760,338 | B2 * | 7/2010 | Waslowski et al. | 356/28 |
| 7,826,629 | B2 * | 11/2010 | Miles et al. | 381/172 |
| 2009/0168088 | A1 * | 7/2009 | Rosenblatt | 358/1.12 |

FOREIGN PATENT DOCUMENTS

| DE | 199 21 217 A1 | 11/2000 |
| DE | 20 2005 020 654 U1 | 6/2006 |
| JP | 2000-202369 | 7/2000 |

OTHER PUBLICATIONS

Notification According to Rule 71(3) PCT, dated September 20, 2010, issued by the European Patent Office in connection with Counterpart European Patent Application No. 08 014 744.0.
U.S. Office Action dated Dec. 28, 2007 issued in related U.S. Application No. 11/415,506.

* cited by examiner

*Primary Examiner* — Jacques M Saint Surin
(74) *Attorney, Agent, or Firm* — Venable LLP; Robert Kinberg

(57) ABSTRACT

A sensor arrangement for detecting objects, includes an ultrasonic sensor and an optical sensor integrated into the ultrasonic sensor.

11 Claims, 3 Drawing Sheets

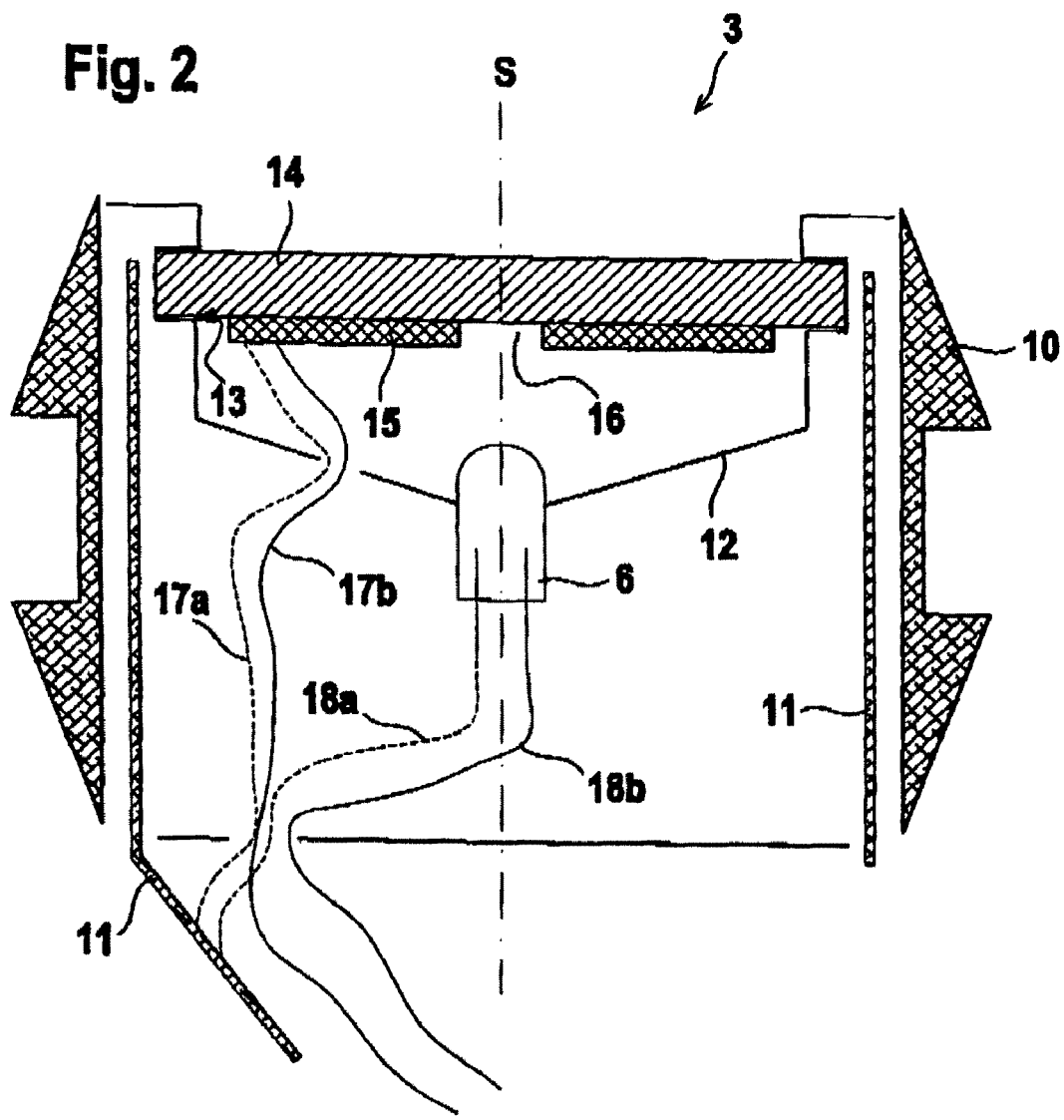
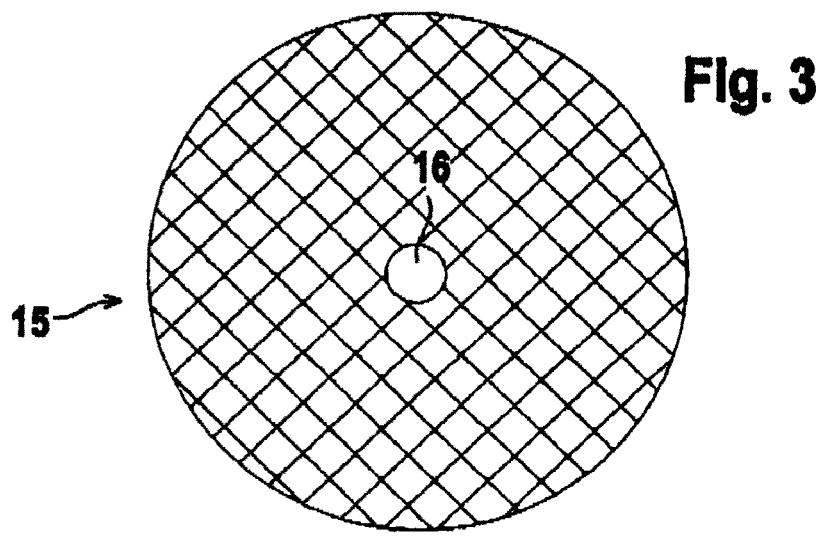

SENSOR ARRANGEMENT

CROSS REFERENCE TO RELATED APPLICATION

This application claims the priority of German Patent Application No. 10 2007 046 769.0, filed on Sep. 29, 2007, the subject matter of which is incorporated herein by reference.

BACKGROUND OF THE INVENTION

The present invention relates to a sensor arrangement for detecting objects with aid of an ultrasonic sensor.

A sensor arrangement of this type is disclosed in German patent document DE 20 2005 020 654 U1. The sensor arrangement described therein is used for detecting labels on a carrier material and comprises an optical sensor as well as an ultrasonic sensor, which can be activated optionally with the aid of a switching device for detecting the labels.

The optical sensor and the ultrasonic sensor operate based on the principle of the transmission measurement, meaning the transmitter and the receiver for the optical sensor on the one hand, and the ultrasonic transmitter and the ultrasonic receiver for the ultrasonic sensor on the other hand are respectively arranged on both sides of a detection plane, in which the carrier material with the labels is guided relative to the device. The sensor arrangement is arranged inside a fork-shaped housing with two fork arms, between which the detection plane extends. The components of the optical sensor and the ultrasonic sensor are arranged inside this housing so that the beam axis for the ultrasonic waves, emitted by the ultrasonic transmitter, and the optical axis for the light rays emitted by the transmitter intersect in the detection plane. As a result, the actual measuring location and the point in time for detecting the labels are not dependent on whether the ultrasonic sensor or the optical sensor is used for the detection.

Since an ultrasonic sensor or an optical sensor can optionally be used for the label detection with this type of sensor arrangement, a broad spectrum of label materials and carrier materials can be securely detected with this sensor arrangement.

The ultrasonic transmitter and the ultrasonic receiver on the one hand and the components of the optical sensor on the other hand must be arranged to be spatially offset, relative to each other, to achieve that the ultrasonic waves and the transmitted light rays intersect in a detection plane. That is to say, the beam axes for the ultrasonic waves and the transmitted light rays extend at a defined angle to each other. A considerable structural expenditure along with relatively large dimensions for the housing are therefore required to accommodate the sensor arrangement.

SUMMARY OF THE INVENTION

It is an object of the present invention to provide a sensor arrangement of the aforementioned type, which results in a higher detection safety at low structural expenditure.

The above and other objects are accomplished according to one aspect of the invention, wherein there is provided a sensor arrangement for detecting objects, comprising: an ultrasonic sensor, and an optical sensor integrated into the ultrasonic sensor.

A particularly compact sensor arrangement with small structural volume is thereby obtained by integrating the optical sensor into the ultrasonic sensor. An additional advantage is that as a result of the integration of the optical sensor into the ultrasonic sensor, components can take on the dual task of functioning simultaneously as relevant components of the optical sensor and of the ultrasonic sensor, thereby resulting in a considerable reduction in the production costs for the sensor arrangement.

Another essential advantage of the sensor arrangement according to the invention is that the ultrasonic sensor with the therein integrated optical sensor takes the form of a pre-assembly, thus making it unnecessary to separately assemble the ultrasonic sensors and the optical sensors and to align the ultrasonic sensors and the optical sensor, relative to each other.

The ultrasonic sensor for the sensor arrangement according to the invention is provided with at least one ultrasonic converter, functioning either as a ultrasonic transmitter or as a ultrasonic receiver. Integrated into this ultrasonic converter is an optoelectronic element that functions as a transmitter for emitting light rays or as a receiver for receiving light rays. In principle, the optoelectronic element can also be a combination transmitting/receiving element.

It is particularly advantageous if the beam axes for the ultrasonic waves and the transmitted light rays extend coaxial to each other. As a result, objects to be detected are thus detected at the same location by the ultrasonic waves and the transmitted light rays. This is particularly advantageous if the objects are moving past the sensor arrangement because object structures such as object edges can thus be detected nearly at the same time by the optical sensor and the ultrasonic sensor. Owing to the simultaneous detection of the objects, there are no timing problems during the evaluation of the signals generated by the optical sensor and the ultrasonic sensor, which leads to higher measuring accuracy for the object detection.

With the sensor arrangement according to the invention, either the ultrasonic sensor or the optical sensor can be activated separately, depending on the condition of the objects to be detected. In particular, the ultrasonic sensor and the optical sensor can be activated alternating, wherein the ultrasonic sensor and the optical sensor can furthermore also be activated jointly. As a result of the object-dependent selection of the activation of the optical sensor and the ultrasonic sensor, the detection accuracy of the sensor arrangement can be increased further.

In general, the optical sensor can be embodied to emit light rays in the visible wavelength range. However, the optical sensor can also emit light rays in the infrared or the ultraviolet range.

The optical sensor and the ultrasonic sensor of the sensor arrangement advantageously operate according to the transmission measurement principle. In particular the structures of multi-layer and/or multi-course objects can be detected with this sensor arrangement. The sensor arrangement is especially suitable for detecting labels that are arranged on a carrier material.

BRIEF DESCRIPTION OF THE DRAWINGS

The present invention will be more readily understood from the following detailed description when read in conjunction with the accompanying drawings, in which:

FIG. 2 is a first embodiment of an ultrasonic converter with therein integrated optoelectronic element for the sensor arrangement according to FIG. 1;

FIG. 3 is a view from above of a ceramic element for the ultrasonic converter according to FIG. 2;

DETAILED DESCRIPTION

Figure 1:
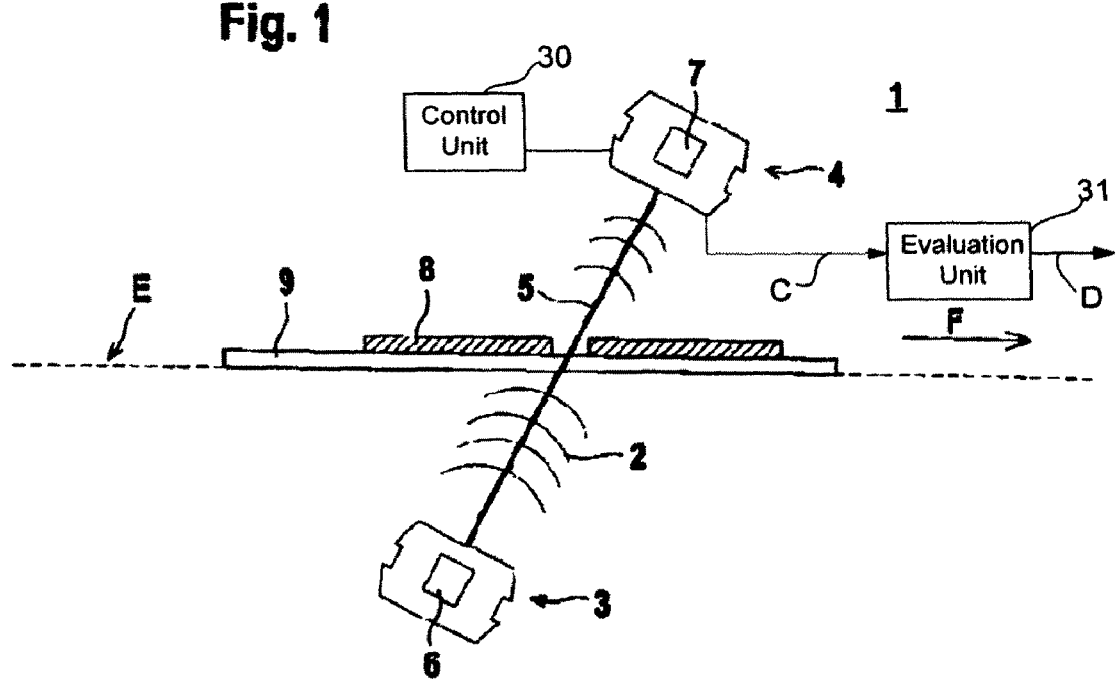
FIG. 1 is an embodiment of the sensor arrangement according to the invention for detecting labels on a carrier material.

FIG. 1 diagrammatically shows the configuration of a sensor arrangement 1 for detecting objects within a predetermined monitoring area. The sensor arrangement 1 comprises an ultrasonic sensor, provided with a first ultrasonic converter, which functions as ultrasonic transmitter 3 for emitting ultrasonic waves 2, as well as a second ultrasonic converter that functions as ultrasonic receiver 4 for receiving the ultrasonic waves 2. An optical sensor is integrated into the ultrasonic sensor, wherein this optical sensor comprises as an optoelectronic element, a transmitter 6 for emitting light rays 5 as well as a receiver 7 for receiving light rays. An optoelectronic element is integrated into each ultrasonic converter. In the present case, the transmitter 6 is integrated into the ultrasonic transmitter 3 and the receiver 7 is integrated into the ultrasonic receiver 4. FIG. 1 shows that the optoelectronic elements are integrated into the ultrasonic converter so that the beam axes of the ultrasonic waves 2, which are emitted by the ultrasonic transmitter 3, and the light rays 5, which are emitted by the transmitter 6, extend coaxially.

The objects to be detected are labels 8 which are integrated on a carrier material 9. The carrier material 9 is located in a detection plane E and is conveyed in a conveying direction F. The labels 8 are positioned one after another and spaced apart on the carrier material 9, as seen in conveying direction F.

The beam axis for the ultrasonic waves 2 extends at an angle to the detection plane E to prevent a reflection back of the ultrasonic waves 2 emitted by the ultrasonic sensor. To secure the position shown in FIG. 1 for the ultrasonic converters, these can be integrated into a fork-shaped sensor housing that is not shown herein.

The object detection with the aid of the optical sensor and the ultrasonic sensor uses in each case the transmission measuring principle. For this, the ultrasonic transmitter 3 and the ultrasonic receiver 4 and thus also the optoelectronic transmitter 6 and the optoelectronic receiver 7, respectively, are arranged on different sides of the objects to be detected. Depending on whether the ultrasonic waves 2 or the transmitted light rays 5 impinge only on the carrier material 9 or on a label 8 with the carrier material 9 positioned underneath, the waves are weakened differently while passing through the object structure. For label detection, the output signals C of the ultrasonic receiver 4 and the optoelectronic receiver 7 are evaluated in an evaluation unit 31. The output signals C of the ultrasonic receiver 4 and the optoelectronic receiver 7 are preferably linked in each case to a threshold value for generating a binary object detection signal D, wherein the switching states for each object detection signal D indicate whether or not a label 8 is present. With the aid of a control unit 30, the optical sensor and the ultrasonic sensor can be activated individually or jointly. If only the optical sensor is activated or only the ultrasonic sensor, its object detection signal forms the binary switching signal D, which is emitted as a sensor output signal by the sensor arrangement 1. If the optical sensor and the ultrasonic sensor are jointly activated, then the output signals from both sensors are used for generating the binary switching signal D. In the simplest case, the object detection signals from the ultrasonic sensor are logically linked to the object detection signal coming from the optical sensor in order to form the binary switching signal D.

FIG. 2 shows a first embodiment of an ultrasonic converter for the sensor arrangement 1, shown in FIG. 1. The ultrasonic converter according to FIG. 2 thus forms the ultrasonic transmitter 3 for the sensor arrangement 1 according to FIG. 1.

The ultrasonic converter is configured essentially rotationally symmetrical to the axis of symmetry S. The ultrasonic converter is integrated into a housing 10. A shielding cup 11 for protecting against electromagnetic waves extends along the inside wall of the housing 10.

The transmitter 6, which in this case is a light-emitting diode, functions as the optoelectronic element of the optical sensor and is located on the inside of the housing 10. The transmitter 6 is positioned with the aid of a cup-shaped holder 12 on the inside of the housing 10, such that the beam axis for the light rays 5 emitted by the transmitter 6 coincides with the symmetry axis S.

The housing 10 is provided with an opening in the front. A groove 13 extends circumferentially on the inside of the housing 10, in the region of this opening. This groove 13 serves to accommodate a membrane 14 with a ceramic element 15 positioned on its back.

The circular disk-shaped membrane 14 is transparent, meaning it allows the light rays 5 from the transmitter 6 to pass through. The also circular-disk shaped ceramic element 15 is provided with a central bore 16, as shown in particular in the individual representation of the ceramic element 15 in FIG. 3. This bore 16 functions as a pinhole. The light rays 5 emitted by the transmitter 6 are thus conducted along the axis of symmetry S, through the pinhole, and then through the membrane 14 and out of the ultrasonic converter housing 10.

The ceramic element 15 is a piezo-element, which generates oscillations and thus the ultrasonic waves 2. For this, the top and bottom sides of the ceramic element 15 are coated with a layer of metal. The oscillations in the ceramic element 15 are triggered by applying voltage to the metal layers. The membrane 14 is intended to be an adaptation layer, designed to obtain the most efficient uncoupling possible of the oscillation energy of the ultrasonic waves 2, meaning to achieve the most efficient energy transfer from the piezo-element to the ambient layer of air surrounding the outside of the housing 10.

Two connecting lines 17a, 17b are conducted to the ceramic element 15 functioning as a piezo-element for generating ultrasonic waves 2. One of the connecting lines 17a is conducted from the ceramic element 15 to the shielding cup 11, meaning the connecting line 17a forms a ground connection. The other connecting line 17b leads from the ceramic element 15 to the control unit 30, which is used to activate the ultrasonic transmitter 3. Two additional connecting lines 18a, 18b lead away from the transmitter 6, wherein one connecting line 18a leads to the control unit 30 and the other connecting line 18b leads to the shielding cup 11.

The ultrasonic receiver 4 of the sensor arrangement 1 is configured similarly as shown in FIG. 2.

Figure 4:
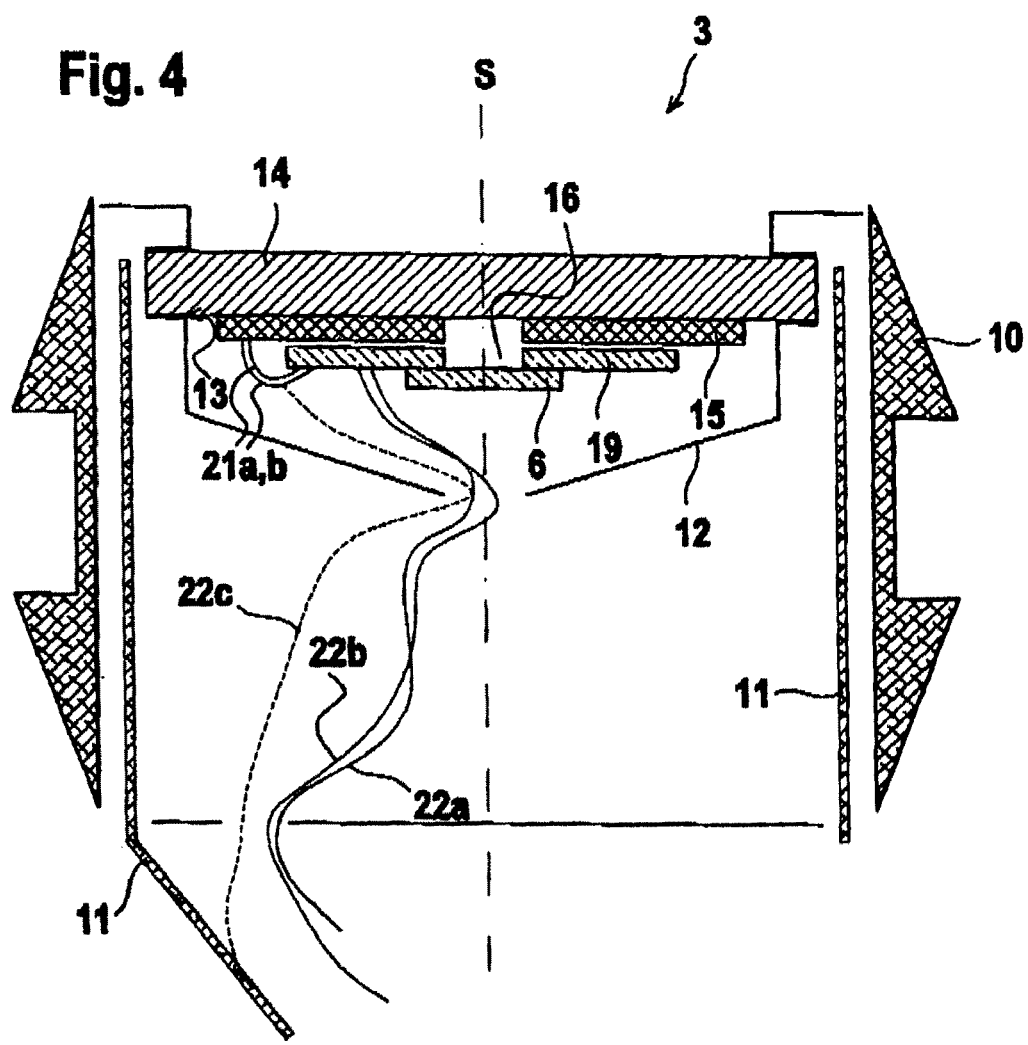
FIG. 4 is a second embodiment of an ultrasonic converter with therein integrated optoelectronic element for the sensor arrangement according to FIG. 1.
Figure 5:
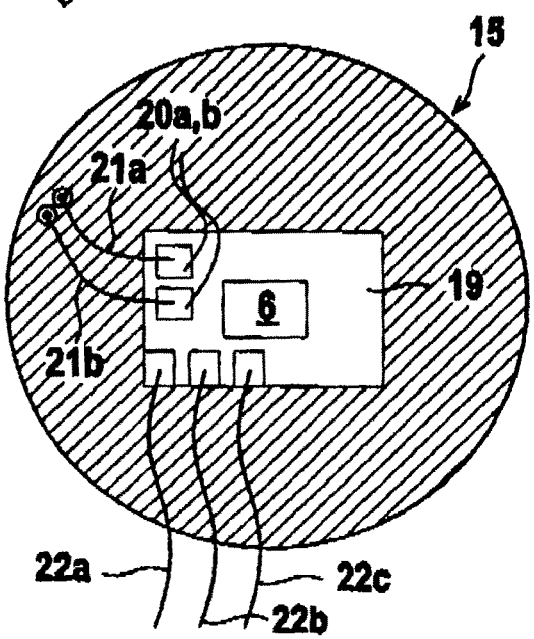
FIG. 5 is a view from above of the ceramic element with thereon mounted optoelectronic element for the ultrasonic converter according to FIG. 4.

FIG. 4 shows a modification of the ultrasonic converter according to FIG. 2. The ultrasonic converter in this case is also embodied as ultrasonic transmitter 3, wherein an optical transmitter 6 as the optoelectronic element for the optical sensor is arranged on the inside of the housing 10 for the ultrasonic converter.

This embodiment differs from the embodiment shown in FIG. 2 in that the transmitter 6 is configured as SMD (surface mounted device) component on a printed circuit board 19. The printed circuit board 19 is attached, preferably glued, directly to the back of the ceramic element 15 that forms the piezo-element. The transmitter 6 is arranged on the printed circuit board 19 so that the transmitter 6 is positioned directly behind the bore 16 in the ceramic element 15, which functions as a pinhole. As a result, the light rays 5 emitted by the transmitter 6 are again conducted through the pinhole, the transparent membrane 14, and then out of the ultrasonic converter.

Alternatively, the transmitter 6 can also be bonded onto the ceramic element 15. Electronic components for activating the transmitter 6 are provided on the printed circuit board 19. The printed circuit board 19 furthermore comprises the connecting pads 20a, 20b from which bonding wires 21a, 21b lead to the ceramic element 15, so that the printed circuit board 19 also makes contact with the piezo-element.

As a result, only two connecting lines 22a, 22b need to be conducted from the printed circuit board 19 to the control unit 30, wherein the control unit 30 also controls the ultrasonic transmitter 3 and the transmitter 6. For a ground connection, an additional connecting line 22c is conducted from the printed circuit board 19 to the shielding cup 11 on the inside wall of the housing 10.

It will be understood that the above description of the present invention is susceptible to various modifications, changes and adaptations, and the same are intended to be comprehended within the meaning and range of equivalents of the appended claims.

What is claimed is:

1. A sensor arrangement for detecting objects, comprising:
    first and second housings;
    an ultrasonic sensor including:
        a first ultrasonic converter that emits ultrasonic waves; and
        a second ultrasonic converter that receives ultrasonic waves;
        wherein the first and second ultrasonic converters comprise, respectively, first and second piezo ceramic discs each having a center bore and being integrated into the first and second housings, respectively; and
    an optical sensor integrated into the ultrasonic sensor, wherein the optical sensor comprises:
        a first optoelectronic element that transmits light rays and is arranged in the first housing behind the first piezo ceramic disc the center bore of which constitutes an aperture for transmitted light rays;
        a second optoelectronic element that receives the light rays transmitted from the optoelectronic light transmitter and arranged in the second housing behind the second piezo ceramic disc the center bore of which constitutes an aperture for the received light rays; and
        first and second membranes each permeable to light rays and arranged, respectively, on the first and second piezo ceramic discs on a side remote from, respectively, the first and second optoelectronic elements.

2. The sensor arrangement according to claim 1, wherein the ultrasonic converters and the optoelectronic elements are arranged so that the ultrasonic waves and the light rays have coaxial paths.

3. The sensor arrangement according to claim 1, wherein at least one of the optoelectronic elements is arranged at a distance to the back of the respective piezo ceramic element.

4. The sensor arrangement according to claim 3, further comprising a printed circuit board on the back of one of the piezo ceramic elements, wherein a corresponding one of the optoelectronic elements is arranged on the printed circuit board.

5. The sensor arrangement according to claim 1, wherein at least one of the optoelectronic elements is bonded to the piezo ceramic element.

6. The sensor arrangement according to claim 1, further comprising a shielding cup coupled to an inside wall of one of the housings.

7. The sensor arrangement according to claim 1, further comprising a control unit to individually activate the ultrasonic sensor and the optical sensor.

8. The sensor arrangement according to claim 1, further comprising a control unit to activate the ultrasonic sensor and the optical sensor jointly.

9. The sensor arrangement according to claim 1, further including an evaluation unit coupled to an output of the ultrasonic sensor with integrated optical sensor and generating a binary switching signal as an output signal.

10. A method for detecting multi-layer and/or multi-course objects, comprising utilizing the sensor arrangement according to claim 1.

11. A method for detecting labels arranged on a carrier material, comprising utilizing the sensor arrangement according to claim 1.

* * * * *